Sept. 28, 1965     A. D. STRUBLE, JR     3,209,156
UNDERWATER GENERATOR
Filed April 3, 1962     4 Sheets-Sheet 1
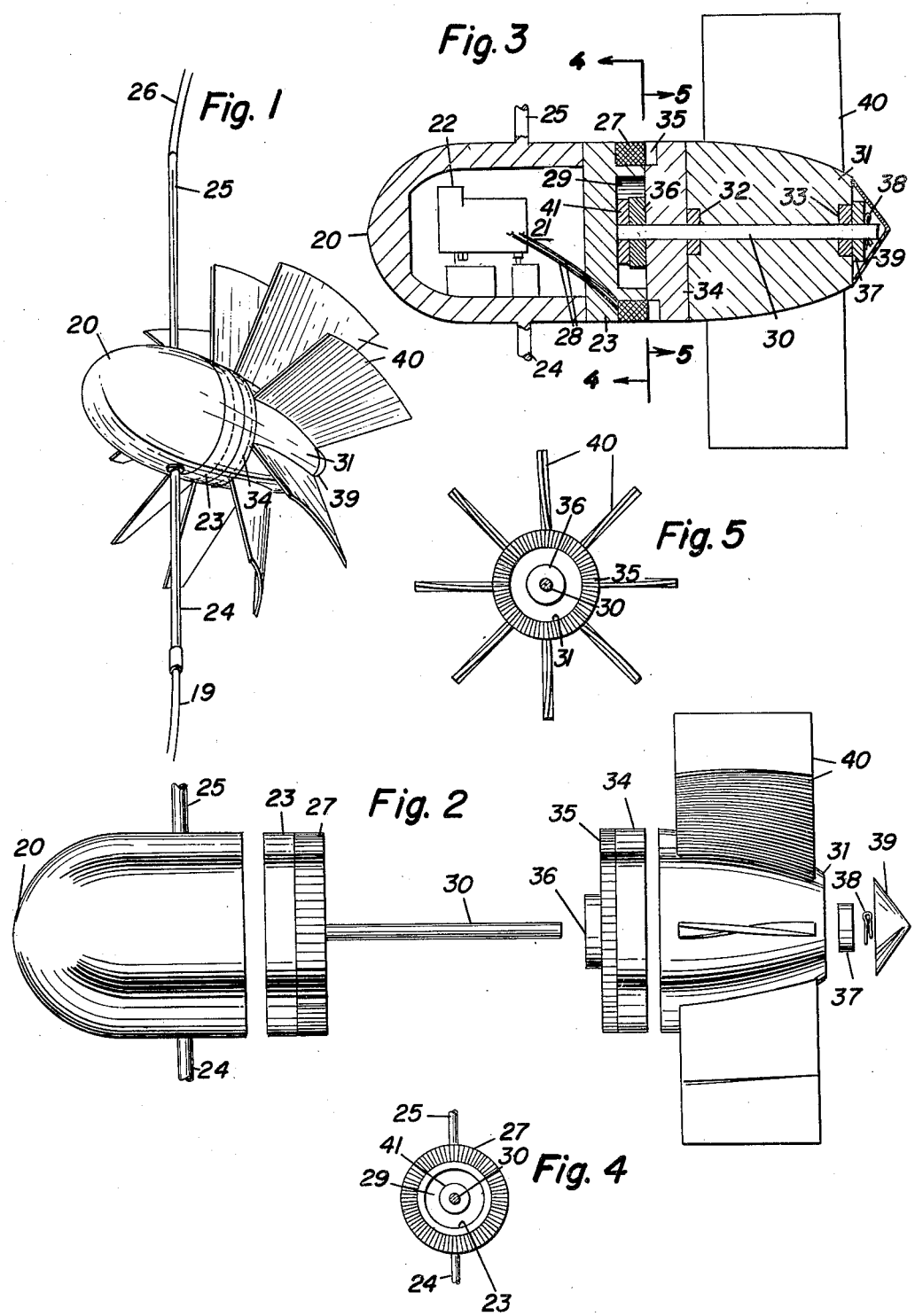

Sept. 28, 1965

A. D. STRUBLE, JR 3,209,156

UNDERWATER GENERATOR

Filed April 3, 1962

Sept. 28, 1965  A. D. STRUBLE, JR  3,209,156
UNDERWATER GENERATOR

Filed April 3, 1962  4 Sheets-Sheet 3

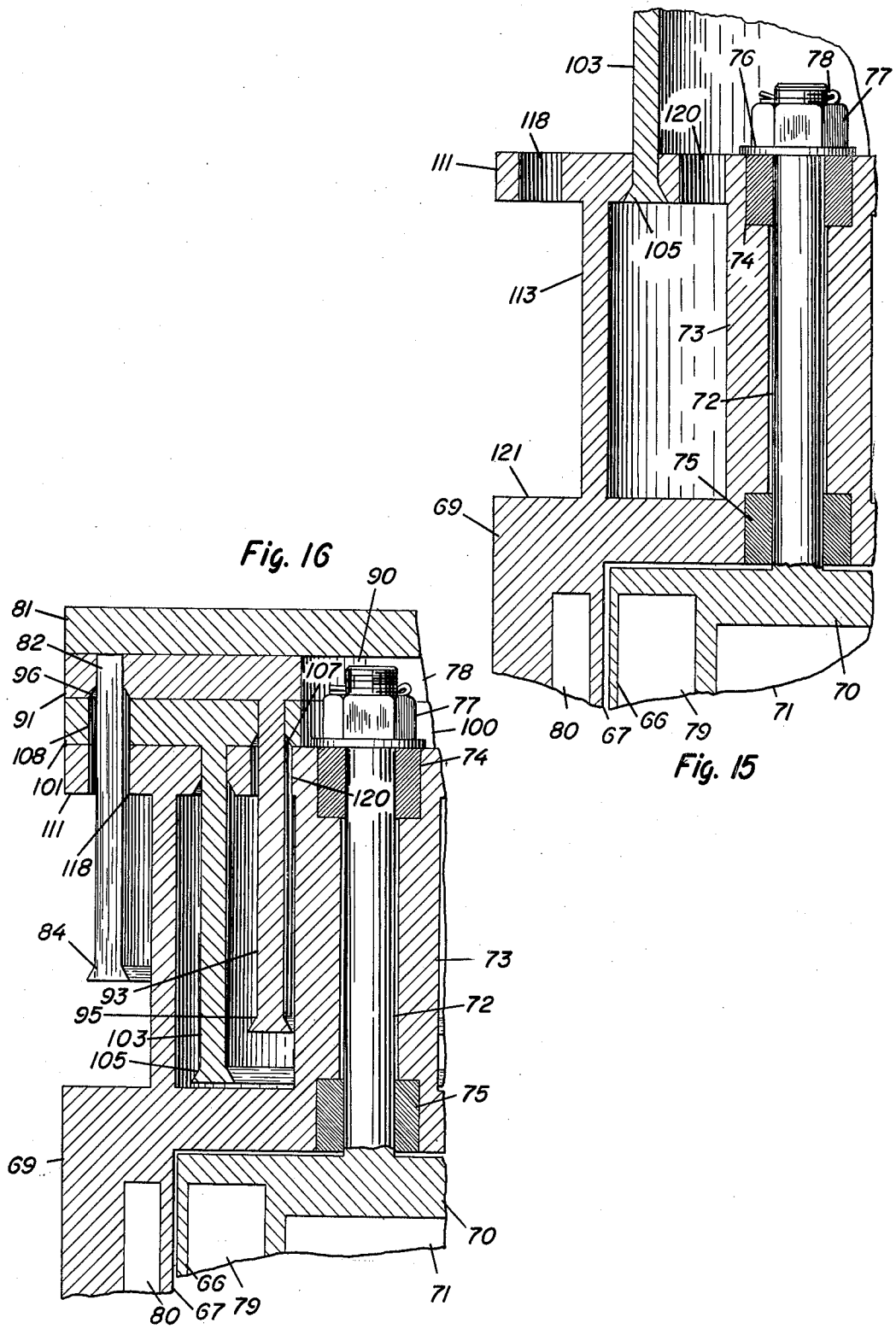

United States Patent Office 3,209,156
Patented Sept. 28, 1965

3,209,156
UNDERWATER GENERATOR
Arthur D. Struble, Jr., 2101 Rosita Place,
Palos Verdes, Calif.
Filed Apr. 3, 1962, Ser. No. 184,713
9 Claims. (Cl. 290—54)

This invention generally relates to impeller driven electrical generators for converting the force of subsurface water currents into electrical energy. More particularly, the invention relates to a new mode of association between the impeller and the elements of the generator, per se, in generator equipment of the character described.

With the growing importance of submarine detection, underwater communications and measurement of oceanographic phenomena, a need has arisen for practical devices which would make possible the dispersal of a large number of self-powdered, unattended measuring and sensing units at widely dispersed locations beneath the surface of the ocean or other bodies of water. Since such sensing and measuring units would ordinarily be powered by electricity, the feasibility of such systems is conditioned upon their ability to produce sufficient electrical power to be self-sustaining over long periods of time. The source of electrical power should have a minimum probability of failure due to leakage, exhaustion and other causes. Recent attempts to provide suitable sources of electrical power for subsurface sensing and measuring devices have largely centered around the use of batteries and nuclear or thermionic power conversion systems. However, these attempts have been hindered by endurance, weight and cost limitations.

Battery systems having the needed endurance tend to be massive and extremely expensive. Nuclear and thermionic power conversion systems tend to yield small amounts of power per unit of weight. All three of these types of systems are characterized by the storing and conversion of a fuel which must eventually become exhausted through use, high initial cost, a low power yield per unit of weight and unnecessarily large bulk. The fact that those skilled in the art have recognized the value and importance of underwater impeller driven generators is evidenced by the many patents which have been granted on such machines. They offer the advantages of not depending upon a depletable fuel supply, yielding a relatively large yield of current per unit of weight, having a low volume, and offering the possibility of low initial cost. However, it is believed possible to improve over presently available underwater generators, especially with regard to the requirements of durability, weight and cost of construction.

A common feature of known underwater generators is a waterproof casing, or body, within which is located the parts of the generator, per se. The term "generator, per se" refers to the stationary and/or moving coils, brushes, commutators, field magnets, and other apparatus which actually generate current, as opposed to the impeller which drives them. The impeller is usually mounted upon a rotatable shaft, which may be referred to as the impeller shaft. At least a portion of the impeller shaft is external to the body. That shaft or another shaft connected thereto is in turn connected to the generator elements within the body.

The impeller is made to rotate by natural subsurface currents impinging against its blades. In order to transmit the kinetic energy of the impeller to the generator elements within the body, and opening is usually provided for one of the above-mentioned shafts to pass through a wall of the body. The opening is sealed against the intrusion of water by packings, glands or seals and the like. However, it is inevitable that such means for providing a seal will deteriorate over a period of time.

Most seals exert pressure against the rotating part to prevent the entry of water. Rotation of the shaft will wear out the seal. The force of the seal against the rotating shaft is frequently determined by the pressure of the water due to its depth. When the force of the seal against the shaft is great, the amount of wear that will occur with each turn of the shaft is correspondingly increased. Therefore, the deeper such a device is submerged, the sooner it can be expected to fail.

As the seal wears, small amounts of sea water will gain access to the interior of the body. The space within the body is filled with the elements of the generator, per se and with the delicate listening and/or measuring devices. These parts are vulnerable to disablement by contact with sea water in many cases. Therefore they will be rendered useless once the shaft seal has worn down enough to admit sufficient quantities of sea water.

One possible approach to the solution of this problem is the provision of better rotary shaft seals which would endure longer use. Another, and apparently more fruitful approach, is the basic alternation in the mode of association between the impeller and the generator elements per se which is the subject of the present invention. Thus the necessity for a rotary shaft passing through a vulnerable seal and body is eliminated. Hence it is an object of this invention to provide an impeller-driven underwater generator unit including generator elements mounted in the exterior surface of the body of said unit for generating electric current without resort to a rotary drive shaft passing through a seal from the exterior of the body portion to generator elements within said body portion.

A further object of this invention is the provision of a new mode of association between the impeller and the elements of the generator, per se in an underwater generator for releasing additional valuable payload space within the body portion of the device, which space would otherwise be occupied by said generator elements.

Another object of this invention is to provide a novel structure for impeller-driven, underwater generator units, which structure renders feasible the construction of such devices from electrolytically inactive materials which consequently have no need of cathodic protection means.

A collateral object of this invention is the provision of an underwater generator having potted stator and field members. The term "potted" is used to refer to elements which have been waterproofed by a potting process. Potting is herein defined as that method of protecting an object which comprises the steps of placing the object in a mold of larger dimensions than the object, filling the mold with a resinous substance in a fluid or semi-fluid form and curing said resinous substance whereby said object becomes encapsulated in the resinous mass.

Still another object of this invention is the provision of an underwater generator including a collapsible rotor for facilitating the handling, storage and use of said generator unit.

Still another object of this invention is the provision of an underwater generator provided with a collapsible rotor constructed of buoyant material for automatically telescoping said rotor to its operating position when the unit is plunged beneath the surface of the water.

Other objects and advantages of the present invention will readily suggest themselves to persons skilled in the art.

The objects of this invention are accomplished by an underwater generator which in its broadest sense may be characterized by the following general description. The underwater generator of the present invention includes a body portion having waterproofed stator elements mounted in the exterior surface thereof. The waterproofing may be accomplished by any one of a number of well-known methods, but a potting technique, to be described below, is preferred. The terminology "in the exterior surface" refers to a location flush with or slightly beneath some surface of the body portion which is exposed to free contact with the sea water. This definition is provided because "exterior" is used herein in a sense which may in certain specific cases be in conflict with the generalized, common usage of that term. This fact will become more readily apparent in connection with the descriptions of the exemplary embodiments of the invention. The invention also includes means for anchoring the body portion beneath the surface of the water. The invention further includes means, such as a shaft, secured to the body portion for rotatively securing thereto an impeller assembly. The impeller assembly includes a hub, impeller blades and a field. The field, which may for instance be constructed of small permanent magnets deployed in a circular configuration in a surface of the impeller assembly, is waterproofed in any of several well-known manners. However, it is preferably waterproofed according to the same type of potting technique employed in connection with the stator. The field assembly is attached to the impeller assembly, either directly or indirectly, in such a fashion that the field and stator are held in close proximity to one another with only a slight clearance between them. The hub, to which the impellers are connected, is adapted to rotate upon the above-mentioned shaft or its equivalent. Thus there is a driving connection between the impellers and the field, by means of which connection the field may be caused to rotate past the stator windings and generate an electric current in response to motive power provided by subsurface currents.

Although the invention can be embodied in many forms, only one preferred embodiment and two additional exemplary embodiments are described herein since it is believed that these three examples will suffice to teach the invention to one skilled in the art. The different embodiments will point out some of the many possible structural variations which may be made without departing from the essence of the invention. These embodiments, which are therefore to be regarded as illustrative only and not as limiting the invention, are fully described below and will be readily understood when considered in connection with the accompanying drawings.

The drawings incorporate sectional figures which are taken along section lines provided with arrowheads to identify the direction from which the section is taken. The section lines are identified by numerical symbols corresponding to the figure numbers of the sectional views. Each part of an illustrated embodiment retains the same reference numeral throughout the several figures.

In the drawings:

FIGURE 1 is a perspective view of a first embodiment of the invention;

FIGURE 2 is an exploded view of the FIGURE 1 embodiment—that is to say, the embodiment shown in FIGURE 1;

FIGURE 3 is a vertical, longitudinal section in which the parts which were exploded in FIGURE 2 are shown properly assembled;

FIGURE 4 is a sectional view along section lines 4—4 of FIGURE 3;

FIGURE 5 is a sectional view along section lines 5—5 of FIGURE 3;

FIGURE 15 is an enlarged fragment of FIGURE 14, slightly altered to show parts which would ordinarily not fall within the sectional view;

FIGURE 16 is a similar to FIGURE 15, but shows the inventive embodiment in a non-operational condition;

Figure 6:
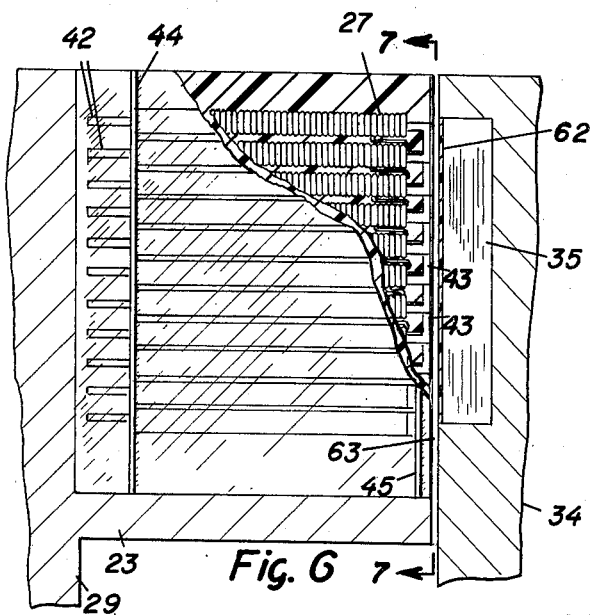
FIGURE 6 is an enlarged fragment of FIGURE 3.

A relatively simple illustrative embodiment of the invention is shown in FIGURES 1–6. In this embodiment the body is a bullet-shaped housing 20 which has within it a payload compartment 21 which serves as a receptacle for a payload device 22, such as an acoustic receiver for the detection of propeller sounds underwater. The open end of the payload compartment is closed off by its disc-shaped rear wall 23 which is fastened to the end of housing 20 with a water-tight seal to prevent leakage of sea water into the payload compartment. Housing 20 and its rear wall 23, along with payload compartment 21, constitute the body portion of the invention in this embodiment. The body is held stationary beneath the water by an anchor (not shown) which is connected to housing 20 by means of a cable 19 and anchor arm 24. Vertical stabilization is provided by stabilizer arm 25 which may be provided with a surface line 26 (optional) for recovery purposes or for connecting a radio transmitter within the payload compartment 21 with an aerial at the surface of the water.

On the exterior of the body portion is the stator 27. In this case it is located just beneath the surface of the rear wall 23. Stator 27 is connected by means of wires 28 to the payload device 22. It will be observed that the stator 27 surrounds a depressed portion 29 of the rear wall 23. The rear wall 23, stator assembly 27, wires 28 and depression 29 may be formed all together as an integral unit by the method which will be described below.

Shaft 30 is mounted in the depression 29 with the aid of disc 41. The disc 41 is fastened to rear wall 23 and to the shaft 30 in any suitable fashion. For instance, the shaft 30 may be provided with male threads to match corresponding female threads in disc 41, which may, in turn, be bolted or screwed fast to rear wall 23. The shaft is thus disposed so that it extends rearwardly along the extended axis of the housing 20.

By means of bearings 32 and 33, the hub 31 is journalled to rotate on shaft 30. Mounted directly on the forward face of hub 31 is the field disc 34. The field, which is a plurality of radially disposed permanent magnets 35, is arranged in the forward surface of field disc 34, opposite the stator windings 27. Also secured to hub 31 are the impellers 40, which are radially disposed. The hub and field disc constitute a driving connection between the impellers and the field magnets. Proper axial positioning of the field with respect to the stator is maintained by a spacer bushing 36, which prevents contact between the stator and field. Thrust bushing 37, which is held in position by a cotter 38, serves as a retainer for the hub. The tail end of the hub is provided with fairing 39 for streamlining purposes.

By reference to FIGURE 6, an enlarged fragment of FIGURE 3, details will now be supplied relative to the generator elements, per se. This embodiment, and the following two embodiments, utilize a generator of the well-known "alternator" type. This type of generator requires no brushes or commutator and is therefore best suited for use in the present invention. The stator assembly is shown in FIGURE 6 to include a plurality of parallel pole pieces 42, about which are wound the bifilar stator windings 27. Each pole piece has a pole shoe 43 located in the surface of the body portion, and more particularly for purposes of this embodiment only, just beneath the rearward surface of rear wall 23. The pole shoes 43 are covered with a very thin layer of waterproofing material, in this case a layer of resin 63. Thus, were it not for the presence of such resin, the shoes 43 would be flush with the rear surface of rear wall 23 and would be exposed to the sea water in which the unit operates.

Figures 7, 8:
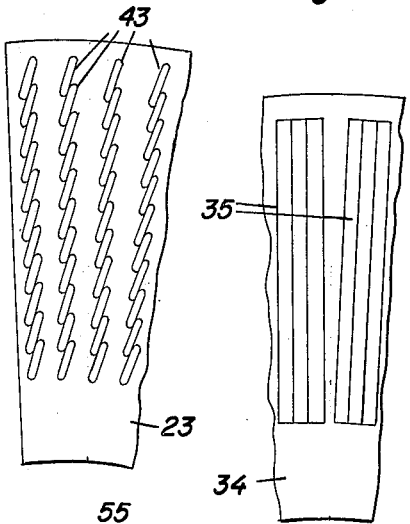
FIGURE 7 is an enlarged fragment of FIGURE 4.
FIGURE 8 is an enlarged fragment of FIGURE 5.

It appears in FIGURE 6 that the pole shoes 43 are laid end to end. However, as shown in FIGURE 7, the pole shoes are arranged along imaginary radial lines, with each pole shoe being canted away from the line. Thus the inward end of each shoe is at a lesser radial distance from the axis of the generator than is the outward end of the next shoe toward the center on the same radial line.

The field is composed of a large number of permanent magnets 35 of U-shaped cross section. These magnets are also arranged in a radial fashion, as shown in FIGURES 5 and 8. They are at such a radius from the center of field disc 34 that they face the stator pole shoes 43 when the hub 31 is properly in place on shaft 30. No particular number of magnets and stator windings is required. It may be found desirable, however, to subdivide the stator electrically depending upon the power requirements of the payload. It may also be found desirable to construct the stator with a number of "poles" which differs from the number of magnets employed. Thus "cogging" effects which would otherwise attend slow speed operation of the generator, can be obviated. It will be observed that the faces of the magnets are also covered with a thin layer 62 of waterproofing material.

Thus the field and stator are each coated with a layer of waterproof material of such thickness and constituency that it will not adversely affect the efficiency of the generator. The layers 62 and 63 are maintained at a slight clearance from one another by the spacer bushing 36 and thrust bushing 37 which maintain the axial relationship between the body portion and the impeller assembly.

The above-described generator is eminently suited for connstruction with materials which are predominantly nonmetallic and which therefore are most durable for undersea use. Those skilled in the art will readily select various suitable materials. One skilled in the art could undoubtedly construct the invention easily without further information. However, the generator of the present invention is best constructed according to a potting method which will be briefly explained in connection with brief comments concerning materials.

The stator pole pieces 42, pole shoes 43 and windings 27 are first assembled with the aid of spacers 44 and 45 which are drilled to receive the small pole pieces. The spacers are preferably cut from thin sheets of fiber glass reinforced polyester resin. Once constructed, the stator assembly should be momentarily laid aside.

A cylindrical mold should be provided having a shape corresponding to that of the rear wall 23. The bottom of the mold should have a cylindrical upward protuberance corresponding in shape to the depressed portion 29 of the rear wall. With the mold on a level surface, a thin first layer of catalyzed liquid polyester resin should be poured onto its bottom surface, care being taken to cover the entire surface. After the catalyzed resin has polymerized and become solid, it will have sufficient mechanical strength to support the stator assembly. Before this first layer of resin (which corresponds to layer 62) is cured, the stator assembly should be positioned thereon with the pole shoes downward and resting upon the resin layer. With the stator assembly in place, additional catalyzed resin may then be poured into the mold until it is full. Prior to polymerization of the resin, the mold and its contents should be subjected to a vacuum.

With the aid of the vacuum, any air entrapped in the resin in and around the stator assembly is removed. Thus the resin is caused to flow in and around the stator assembly, completely enveloping every part. If a considerable amount of air has been removed, there will be an appreciable shrinkage of the contents of the mold. Therefore, before the second batch of resin polymerizes, a third addition of liquid resin may be made to fill the mold completely. The unpolymerized resin will soon polymerize. Once the entire resinous mass has polymerized, it may be baked in an oven to cure the resin to a sufficient degree of hardness to make it durable. The result is a rear wall 23 having the stator assembly encapsulated within it, the pole shoes 43 being located just beneath a thin layer of resin 63 on the rear face of the wall 23. After curing, the rear wall and the stator elements encapsulated within it are removed from the mold and are subjected to such finishing operations as are needed to reduce it to true and proper dimensions.

The encapsulation of the magnets 35 within the field disc 34 is accomplished by a series of steps, many of which are identical to the operation described above. The chief differences in the procedure for this part are the substitution of a different mold corresponding in shape to the disc 34 and the installation of the magnets therein instead of the stator poles, etc. The result is a unitary cast resin disc 34 having the magnets embedded in its forward surface under a thin layer of resin 62 which protects them from the water. The spacer bushing 36 may optionally be cast integrally with the disc 34.

The housing 20, hub 31, and impellers 40 may also be cast of resinous material which should preferably include a low density extender. Sufficient extender should be added so that the generator when fully assembled will have a positive buoyancy with respect to water. Otherwise a buoy will have to be provided to prevent the generator from sinking to the bottom of the body of water in which it is to be operated. It is well to coat the entire housing, hub and impellers with a non-fouling coating.

The bearings 32 and 33, the bushings 36 and 37 and the fairing 39 are preferably made of non-metallic material. Nylon is a suitable material for all of them. The shaft 30, cotter 38 and miscellaneous fastenings will ordinarily be made of metal. Control of electrolysis problems is relatively simple and will be complete if a proper selection of materials is made. The selection of proper metals is well within the skill of the art and will be left to the discretion of those who use the invention.

Because of the large proportion of resinous material used in it and because of the encapsulation technique employed, the resulting generator is quite durable. The unit is capable of providing its own buoyancy; it is leakproof; it has no rotary shaft seals to wear out; and the entire space within the housing 20 may be filled with a payload 21, the generator elements, per se, being entirely outside the payload compartment.

Figure 11:
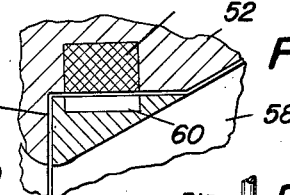
FIGURE 11 is an enlarged fragment of FIGURE 10.
Figure 9:
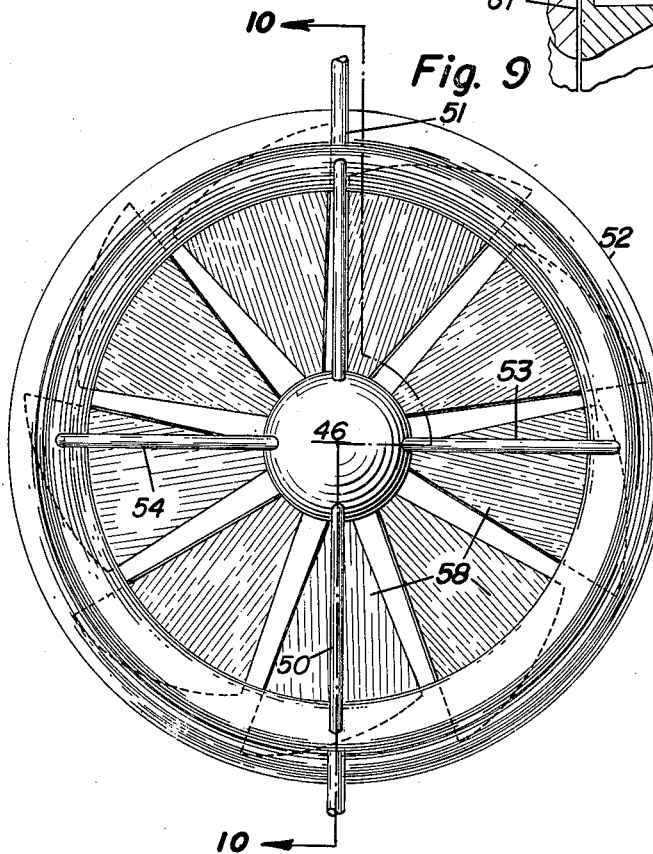
FIGURE 9 is a front elevation of a second embodiment of the invention.
Figure 10:
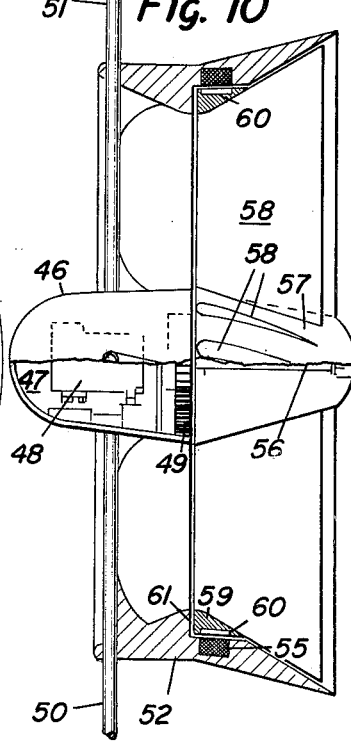
FIGURE 10 is a sectional view along section lines 10—10 in FIGURE 9.

The second embodiment of the invention will now be described in connection with FIGURES 9–11. The second embodiment includes a housing 46 within which is located a payload compartment 47 which serves as a receptacle for a payload device 48. The payload compartment is closed off by a rear wall 49, which has a leakproof seal in order to prevent sea water from entering the payload compartment 47. Like the FIGURE 1 embodiment this embodiment is provided with an anchor arm 50 and a stabilizer arm 51 which serve similar functions to the analogous parts in the prior embodiment. However the anchor arm and stabilizer arm also serve the additional function of furnishing support for a cowl 52 which is of circular configuration and surrounds the longitudinal axis of the housing 46 in spaced apart relationship therewith. Additional support for cowl 52 is provided by horizontal struts 53 and 54. Housing 46, near wall 49, arms 50 and 51, cowl 52 and struts 53 and 54 constitute the body portion of this embodiment. The stator 55 is supported in the radially inner, exterior surface of cowl 52. That is, the stator is mounted in a surface of the cowl which is in free communication with the sea water rather than within a hollowed out portion of the cowl.

Like the FIGURE 1 embodiment, this embodiment is provided with a shaft 56 which projects axially and rearwardly from the rear housing wall 49. The hub 57 is secured thereon in much the same manner as the hub 31 of FIGURES 1–6 is secured to shaft 30. Radially secured to hub 57 are a plurality of impellers 58 whose radially outer ends roughly correspond with the profile of the radially inner surface of the cowl, past which they sweep as they rotate. A field support 59 is mounted on the impeller assembly by attachment to the ends of the impellers 58. In this embodiment, the field support 59 is in the form of a ring which is coaxial with the hub 57 and with the cowl 52, but it is of a lesser diameter than the cowl. The ring 59 rotates within a recess 61 in the inner portion of the exterior surface of the cowl 52, opposite the stator windings 55. Field magnets 60 are positioned in the surface of the ring 59 about its entire periphery, parallel with the shaft 56, so that they are directly opposite the stator 55 and are separated from it by a small clearance. The magnets and the stator are each covered with a thin layer of waterproofing material (not shown). By means of electrical conductor wires (not shown) the stator is connected with the payload device 48 within the housing 46.

Water currents enter the cowl from the front and impinge upon the impellers 58, causing them to turn the field support 59. As the ring rotates, the field magnets sweep past the stator 55 generating electrical current in the stator windings, which current travels over suitable wires (not shown) to the payload device so that it may be powered by such current.

The materials and principles of construction of this embodiment are preferably similar to those of the first-described embodiment. The cowl 52, housing 48, impeller blades 58 and hub 57 are all made preferrably of low density materials, having a positive buoyancy with respect to water. The stator elements are constructed in a manner similar to that described with the first embodiment with the minor difference that the stator poles of this embodiment are disposed generally radially with respect to shaft 56 rather than parallel thereto as in the first embodiment.

The third or preferred embodiment of this invention is shown in FIGURES 12–17. This embodiment shows still another possible arrangement of the generator elements. It also includes an optional added feature, automatically extensible impeller means which render this embodiment more convenient to store, handle and use. In this embodiment, the body portion includes the housing 70. Housing 70 is cylindrical in shape and has a payload compartment 71 within it. Protruding upwardly from the top of housing 70 is a shaft 72 or similar device. Shaft 72 is a means by which the housing is suspended from the rotor assembly.

The rotor assembly includes a hub 73, having bearings 74 and 75 upon which the assembly is free to rotate about shaft 72. The hub is retained on the shaft with the aid of a bushing or washer 76 which is secured to shaft 72 by a lock nut 77 and cutter 78. At the lower end of hub 73 is a lower rotor disc 121. Attached to the disc 121 and depending therefrom is a field ring 69. The field elements are represented schematically in FIGURES 13–16 by boxes 80 which are mounted in the exterior, inside surface of ring 69. This may readily be observed in FIGURES 14, 15 and 16. The magnets 80 are separated from the sea water only by a thin layer of waterproofing materials whose thickness is grossly exaggerated in the drawings.

Field ring 69 maintains the field magnets 80 opposite the stator elements 79 also schematically represented, Stator elements 79 are located in the surface of the body portion, or housing 70, and are separated from the sea water only by a thin layer of waterproofing material which is also grossly exaggerated. Thus the stator and field are separated from one another only by the waterproof layers and by a slight operating clearance between said layers.

This embodiment of the invention also includes an automatic, self-displaying savonius rotor for driving the field magnets 80. The self-displaying impeller includes buoyant impeller discs, buoyant rotor blades, locking means, locking slots corresponding to said locking means, and clearance slots in said impeller discs to receive the aforementioned impellers and to permit the nesting of the various impellers within one another to make a compact assembly.

Figure 12:
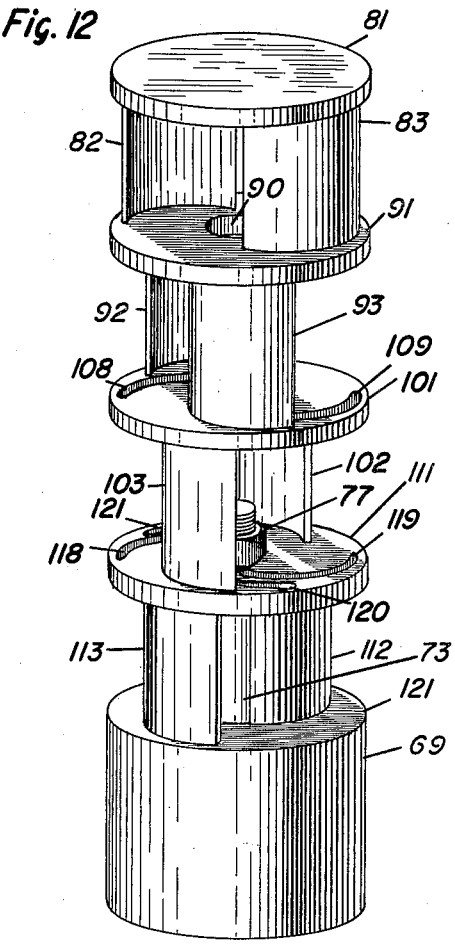
FIGURE 12 is a perspective view of a third embodiment, the preferred embodiment of this invention which is shown therein in an operational condition.

The device is shown in perspective in FIGURE 12 with the rotor fully extended or in the display position. A first pair of savonius rotor blades 82 and 83 are fixedly secured to the underside of the first buoyant rotor disc 81. Blades 82 and 83 in turn support the buoyant rotor disc 91. Depending from beneath rotor disc 91 are a second pair of rotor blades 92 and 93. Rotor blades 92 and 93 are fixedly secured to the rotor disc 91. In the same manner, rotor blades 102 and 103 are secured to disc 101 and blades 112 and 113 are secured to disc 111.

The general design o fthe self-displaying rotor may be summarized as follows: The rotor comprises the four rotor discs 81, 91, 101 and 111. One of these discs, 111, is fixedly secured to the hub 73 like the disc 121. Disposed above the discs 111 and 121 are the discs 81, 91 and 101, which have no direct connection to the hub 73. Each of the discs 81, 91 and 101, has a pair of savonius rotor blades fixedly secured to its underside. Thus, by definition the top of each blade thus secured is fixedly secured to the underside of one of said discs. The bottom edges of said blades, however, are secured to the next lower disc in a fashion which permits a limited degree of telescopic movement therebetween.

Figure 14:
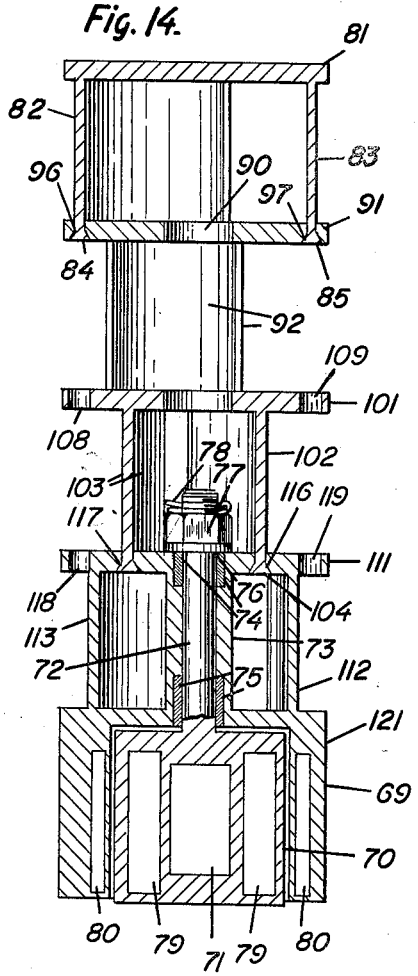
FIGURE 14 is a sectional view along section lines 14—14 in FIGURE 13.

Referring now to FIGURE 14, it will be seen that the savonius rotor blade 82 engages buoyant rotor disc 91 at slot 96. Blade 82 is kept from escaping the slot 96 by means of wedge-shaped locking means 84. The slot 96 is of a corresponding shape to locking means 84 which cannot pass therethrough. Blade 83 is prevented from escaping the disc 91 in the same manner. Because of the shape of the locking slot 84 and the corresponding locking slot 97 for blade 83, the blades 82 and 83 can slide downwardly in their locking slots to a sufficient extent to bring the discs 81 and 91 into contact with one another.

Disc 91 is fixedly secured to its depending savonius rotor blades 92 and 93. Like the impeller blades 82 and 83 the blades 92 and 93 are secured with locking means 94 and 95 respectively. These locking means engage locking slots in the same manner as locking means 84 engages the slot 96.

Because of the placement of the section line 14—14, locking means 94 and 95 and their corresponding locking slots do not appear in FIGURE 14. However, refer to FIGURE 16 which shows locking means 95 on rotor blade 93 and cooperating locking slot 107.

The disc 101 is provided with a clearance slot 108 and a complementary slot 109 for the blades 92 and 93 to pass through when they telescope. Therefore, although the locking slots 106 and 107 prevent the blades 92 and 93 from escaping upwards from the disc 101, the locking slots and the clearance slots in disc 101 do allow the blades 82, 83, 92 and 93 to pass downwards through the disc 101, so that disc 91 may come into contact with disc 101.

Figure 17:
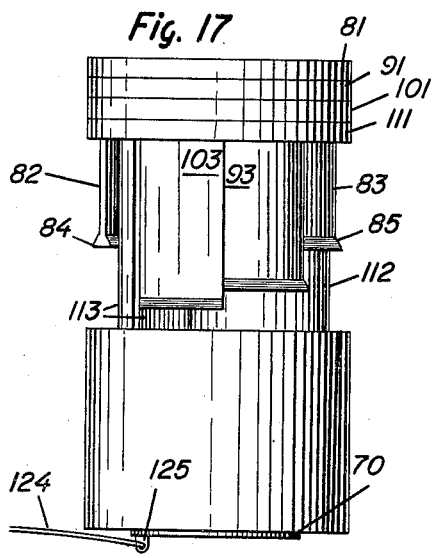
FIGURE 17 is an elevational view of the FIGURE 12 embodiment which is again shown in non-operational or storage condition.
Figure 13:
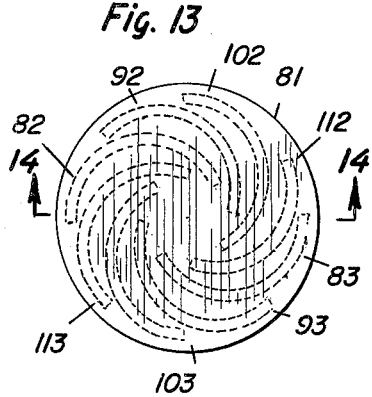
FIGURE 13 is a top view of the FIGURE 12 device.

The impeller blades 102 and 103 depend from disc 101. They too are provided with locking means on their lower edges. The locking means for impellers 102 and 103 are 104 and 105 respectively. The locking means 104 and 105 engage locking slots 116 and 117 respectively. Slots 118 and 119 in disc 111 correspond to the clearance slots 108 and 109 in disc 101. An additional set of clearance slots is provided in the disc 111 for the blades 92 and 93. These slots do not appear in FIGURE 14. One of them, clearance slot 120, which receives the rotor blade 93, has been shown in FIGURES 15 and 16 by introducing a distortion into these figures which is not present in FIGURE 14, a true secitonal view. The above-mentioned clearance slots and locking slots permit the rotor blades 82, 83, 92, 93, 94 and 95 to telescope downwards through the disc 111 so that disc 101 is in contact therewith. Shaft clearance openings 90 and 100 are provided in the discs 91 and 101 respectively so that the entire assembly of discs and impeller blades may be telescoped down into a compact unit, as shown in FIGURE 17.

The operation of the device will be explained now with particular reference to FIGURES 15, 16 and 17. FIGURE 17 represents the appearance of the unit when it is in a collapsed position. It may be stored and handled in this condition until ready for use. When the time comes to use the unit, an anchor may be attached to the housing 70 by means of an anchor line 24 and anchor line securing ring 125 on the bottom of said housing. The length of the anchor line 24 should be selected so that it is less than the depth of the water in which the unit is to operate and preferably considerably less than said depth to insure that the unit will not be damaged by ship propellers or floating objects. With the anchor, anchor line and unit connected together all three may be dropped into the water. Just prior to jettisoning of the unit, the various blades and discs will be in the positions shown in FIGURE 16. However, as the anchor and anchor cable pull the unit beneath the surface, the buoyant discs and blades will tend to float up towards the surface while the housing and remainder of the unit are pulled downward by the anchor. Since the anchor cable securing ring is offset to one side of the housing it will tend to prevent the housing from rotating. However, the rotor assembly, which is free to rotate on the shaft 72, will turn in response to very small current velocities. As the unit begins to turn, the discs 81, 91 and 101 will float upwards, displaying the blades 82, 83, 92, 93, 94 and 95. The aforesaid blades and discs will continue to extend themselves upwardly until the locking means engage the locking slots. At such time the unit will be in the condition shown by FIGURES 12, 14 and 15. With the blades fully extended, the unit is now in its proper operating condition. As the savonius rotor assembly turns it rotates the field with respect to the stator generating a current which is fed to a load device in the payload cavity 71.

It should be apparent to those skilled in the art that the present underwater generator, though extremely simple in nature, effectively eliminates the sources of difficulties inhering in prior art underwater generators which difficulties made them unsuitable for use in isolated locations where they could not be subjected to frequent inspection and maintenance. The nature of the invention is such that embodiments of it may be constructed of materials having little or no electrolytic activity in salt water. This obviates the necessity for cathodic protection. This invention eliminates the necessity for rotary shafts and shaft seals which are vulnerable to failure and leakage. Leakage problems are consequently eliminated. Space within the body of the generator unit, formerly occupied in part by elements of the generator, per se are freed for use in accommodating larger payloads.

Several exemplary embodiments of my invention have been described. It should be understood that the various details thereof are given only by way of illustration and should not be construed as limiting the appended claims which define the inventive concepts.

Having described my invention, I claim:
1. An underwater generator unit comprising:
 (a) a body portion;
 (b) stator means in the exterior surface of said body portion;
 (c) shaft means extending from the exterior of said body portion;
 (d) an impeller assembly journalled on said shaft means said impeller including rotor blades and means for automatically displaying said rotor blades when said unit sinks beneath the surface of the water;
 (e) field means having a driving connection with said impeller assembly, said field means being adapted to rotate in cooperative relationship with said stator elements to produce electric current; and
 (f) means for anchoring said generator unit beneath the surface of a body of water having subsurface currents therein.

2. An underwater generating unit as in claim 1 wherein said body portion is constructed of materials having a sufficiently low specific gravity with respect to water to give said unit a positive buoyancy factor with respect to water.

3. An underwater generating unit comprising:
 (a) a bullet-shaped forwardly projecting body portion, including a payload compartment opening towards the rear end thereof;
 (b) a stator plate covering and sealing off said payload compartment, said stator plate including stator windings in the rear exterior surface thereof;
 (c) shaft means projecting rearwardly from said stator plate;
 (d) an impeller assembly adapted to rotate on said shaft means, said impeller assembly including a hub with forward and rearward ends journalled on said shaft;
 (e) radially disposed impellers secured to said hub;
 (f) a field plate secured to the forward end of said hub in cooperative relationship with said stator windings; and
 (g) means for anchoring said unit beneath the surface of a body of water.

4. An underwater generating unit comprising:
 (a) a bullet-shaped forwardly projecting body portion, including a payload compartment opening towards the rear end thereof;
 (b) a cover plate, covering and sealing off said payload compartment opening;
 (c) shaft means projecting rearwardly from said cover plate;
 (d) support means secured to said body and projecting outwardly therefrom;
 (e) cowl means supported on said support means in concentric, spaced-apart relation to said body;
 (f) stator means in an exterior surface of said cowl;
 (g) an impeller assembly adapted to rotate on said shaft means, said impeller assembly including a hub with forward and rearward ends journalled on said shaft;
 (h) radially disposed impellers secured to said hub;
 (i) a field supporting ring centered about said shaft means and secured to said impellers, said ring having in an exterior surface thereof, field magnets held in cooperating relationship with said stator means; and
 (k) means for maintaining said unit in place beneath the surface of a body of water.

5. An underwater generator unit as in claim 4 wherein said cowl has radially inward and outward surfaces, the radially inward surface thereof including a recess of circular configuration and of slightly greater diameter than said field ring, the exterior surface of said cowl in which said stator means are located being a surface in said recess and said field ring being positioned in said recess for rotation with respect to said stator means.

6. An underwater generator unit comprising:
 (a) a body portion of circular cross section having upper and lower ends and including stator means in peripheral, exterior surface thereof;

(b) means secured to said body portion for maintaining said body portion relatively stationary beneath the surface of a body of water;

(c) an impeller assembly, including a hub and a field supporting member connected to said hub, said field supporting member having a circular cross section and corresponding with said body portion;

(d) shaft means associated with said body portion and said hub which is secured to said body in rotative relationship therewith about a line including the axis of said body portion;

(e) field means in an exterior surface of said field supporting member opposite said stator means in cooperative relationship therewith;

(f) impeller means associated with said hub for rotating said field means with respect to said stator means when said impeller is subjected to subsurface currents in said body of water.

7. An underwater generator unit as in claim 6 wherein the exterior surfaces of said body portion and said field supporting member in which said stator means and said field means are respectively mounted are cylindrical.

8. An underwater generator unit as in claim 6 wherein said body portion is a cylinder and said field supporting member is an annulus which surrounds said cylinder in concentric relation therewith, said annulus having a minor diameter slightly in excess of the diameter of said cylinder.

9. An underwater generator unit as in claim 6 wherein said impeller assembly includes telescoping impeller blades having a non-operational position for storage and handling and an operational position for use, said impeller blades being adapted to move automatically from non-operational to operational position when said unit is placed beneath the surface of the water.

References Cited by the Examiner

UNITED STATES PATENTS

| | | | |
|---|---|---|---|
| 1,123,491 | 1/15 | Corbin | 290—54 |
| 2,436,683 | 2/48 | Wood | 290—54 |
| 2,634,375 | 4/53 | Guimbal | 290—52 |
| 2,707,863 | 5/55 | Rhodes | 310—104 X |
| 2,719,931 | 10/55 | Kober | 310—263 X |

ORIS L. RADER, *Primary Examiner.*